United States Patent [19]

Kurei et al.

[11] 4,179,201
[45] Dec. 18, 1979

[54] LENS STOP BRAKING IN AUTOMATIC EXPOSURE CAMERAS OF STOP VALUE CONTROL TYPE

[75] Inventors: Hiroshi Kurei, Kawagoe; Masahiro Kawasaki, Tokyo; Yukio Takaoka, Asaka, all of Japan

[73] Assignee: Asahi Kogaku Kogyo Kabushiki Kaisha, Tokyo, Japan

[21] Appl. No.: 831,022

[22] Filed: Sep. 6, 1977

[30] Foreign Application Priority Data

Sep. 6, 1976 [JP] Japan .................................. 51-106465
Sep. 7, 1976 [JP] Japan .................................. 51-106912

[51] Int. Cl.² ........................... G03B 7/08; G03B 9/06
[52] U.S. Cl. ......................................... 354/41; 354/43; 354/271
[58] Field of Search ...................... 354/40, 41, 42, 43, 354/235, 270, 271

[56] References Cited

U.S. PATENT DOCUMENTS

| | | | |
|---|---|---|---|
| 3,820,131 | 6/1974 | Tanaka | 354/271 X |
| 3,868,702 | 2/1975 | Strauss et al. | 354/42 |
| 3,921,186 | 11/1975 | Lermann | 354/43 |

Primary Examiner—Michael L. Gellner
Attorney, Agent, or Firm—Sughrue, Rothwell, Mion, Zinn and Macpeak

[57] ABSTRACT

An automatic exposure camera of the stop value control type is provided with lens stop braking to improve the accuracy of the lens stopping operation while at the same time maintaining a high operating speed. A brake magnet mechanism is provided for decelerating the lens stopping mechanism in response to a control circuit. In one form, the control circuit operates the brake magnet mechanism to effect deceleration slightly before the quantity of light reaches a suitable exposure value. Thereafter, when a stop value providing a suitable exposure value is obtained, stopping the lens stopping operation can be done with very high accuracy. In another form, the control circuit compares the variation in light due to the change in aperture with a variation rate to control the energization and de-energization of the brake magnet. In this way, the non-linear operation which is particularly evident at minimal aperture values is eliminated.

9 Claims, 11 Drawing Figures

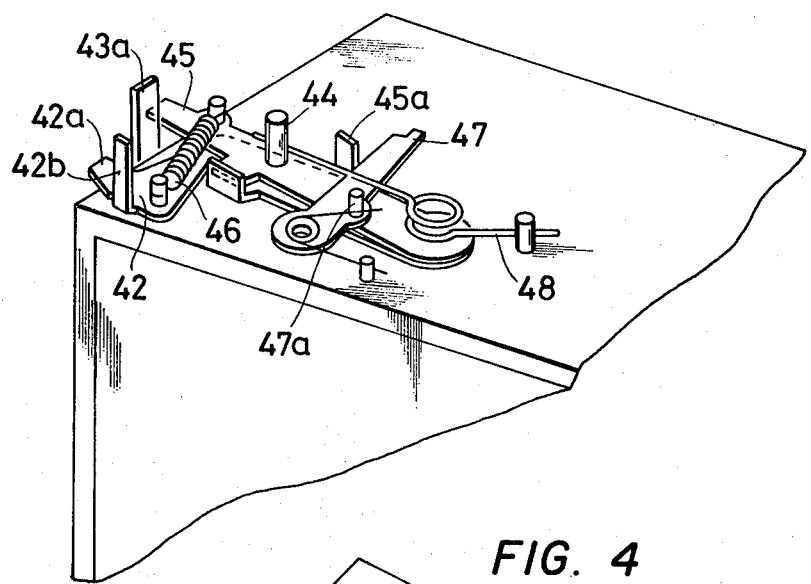
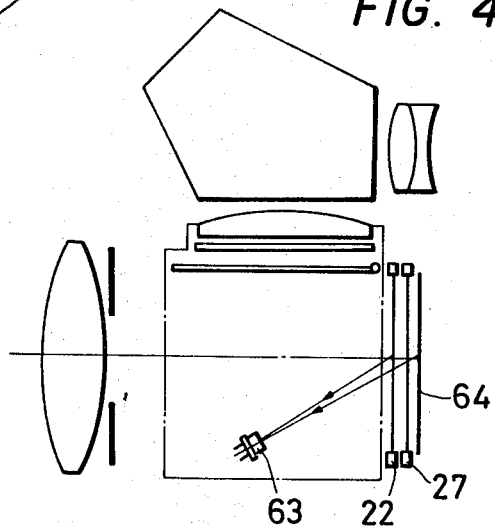

LENS STOP BRAKING IN AUTOMATIC EXPOSURE CAMERAS OF STOP VALUE CONTROL TYPE

BACKGROUND OF THE INVENTION

This invention relates to lens stop braking in automatic exposure cameras of stop value control type.

Automatic exposure cameras of lens stop control type are known in the art in which while the lens is stopped starting from its wide open state, the object's light passed through the lens aperture is measured, and when a suitable lens aperture is obtained With respect to predetermined shutter speed and film sensitivity, the lens stopping operation is stopped thereby automatically determining the lens aperture. If in this conventional automatic exposure camera the lens stopping operation is carried out by the use of the lens only, the operating time required to decrease the aperture starting from its wide open state is too short to lock the lens stop with high accuracy, and therefore a speed slowing mechanism is used in cooperation with an operating member operated by the lens stopping mechanism.

There is a problem, however, in using a speed slowing mechanism. The speed slowing mechanism may be employed to slow down the lens stopping operation so sufficiently that the lens stopping operation can be controlled with high accuracy. However, in the case where a suitable exposure cannot be obtained without decreasing the aperture to an aperture value almost equal to the minimum aperture value, the operating time is increased, that is, the period of time from the release to the shutter operation is increased, thus delaying the shutter operation. In order to overcome this difficulty, a method may be considered in which the effect of the speed slowing mechanism is alleviated to perform the lens stopping operation at higher rate. However, in this case, it is difficult to stop the lens stopping operation with high accuracy.

In addition, in general, the amount of movement required of a lens stop release plate is smaller in the minimum value side of the lens opening value. Therefore, even if a speed slowing mechanism which uniformly operates the lens stop release plate is employed, the quantity of light changes abruptly in the vicinity of the minimum lens opening. Accordingly, in the case when the lens stop release plate is operated at uniform rate, if the time required to change the lens aperture from its full open state to a predetermined value is not sufficiently long, the time per exposure value EV will be extremely short in the vicinity of the minimum lens opening, and therefore it is difficult to achieve the control with high accuracy. Again, in the case when the operating time is sufficiently long, the time from the release to the shutter operation becomes longer, which leads to a delay in shutter operation.

Furthermore, there is a delay time between the de-energization of a locking magnet and the locking operation thereof. Accordingly, it is necessary to de-energize the locking magnet slightly before the aperture is decreased to provide a desired brightness. Since the delay time is constant, if the variation time per EV is relatively long in the vicinity of the full lens opening and relatively short in the vicinity of the minimum lens opening, the locking operation cannot be effected as desired, thus causing an error in aperture control operation.

SUMMARY OF THE INVENTION

Accordingly, an object of this invention is to overcome the above-described difficulties accompanying a conventional automatic exposure camera of lens stop control type. More specifically, an object of the invention is to provide a mechanism in which, irrespective of the fact that the entire operating time is short, the lens stop control can be achieved with high accuracy. Another object of the invention is to provide a lens stop control mechanism with high accuracy which regardless of the short operating time, is not affected by the delay time of the locking magnet.

BRIEF DESCRIPTION OF THE DRAWINGS

The invention will be described with reference to the accompanying drawings wherein like reference numerals in the several views denote the same or similar parts. In the drawings:

FIG. 2 is a perspective view showing the lower part of a mirror box mechanism;

FIG. 4 is a sectional view showing the arrangement of a light receiving element in the camera;

DETAILED DESCRIPTION OF THE INVENTION

Figure 1:
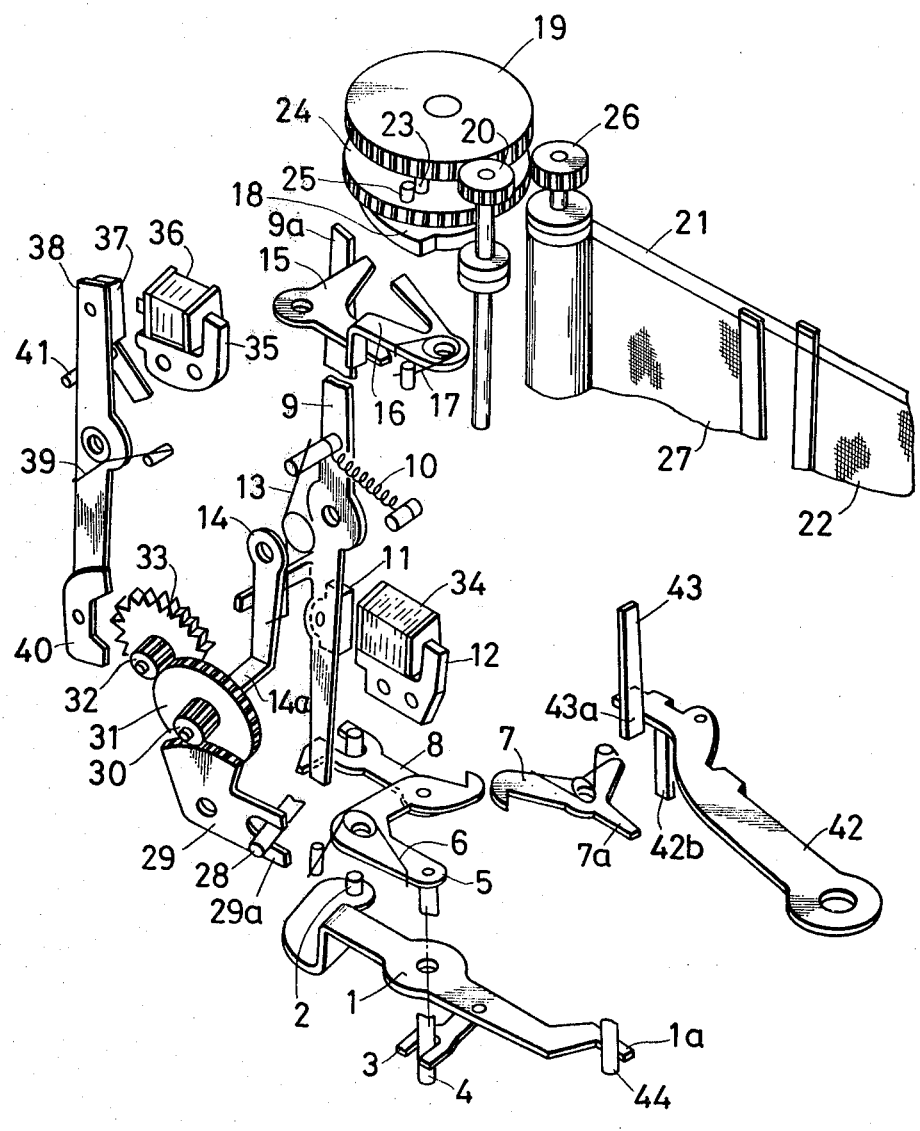
FIG. 1 is a perspective view illustrating a lens stop control and a top curtain locking section according to one feature of this invention.

FIG. 1 illustrates the structures of a stop value control mechanism and an auxiliary brake mechanism, and the structure of a top curtain release device before the winding operation.

First of all, the operation concerning the winding operation will be described.

A cam and a charge pin 2 of a winding mechanism (not shown) are abutted against a charge lever 1. Upon winding, the charge lever 1 is turned clockwise, and a set lever 5 is turned clockwise against the biasing force of a spring 6 through a pin 4 by a fork-shaped lever 3 pivotally secured to the charge lever 1. As a result, an auxiliary set lever 8 pivotally secured to the set lever 5 is displaced rightward as viewed in the figure so that an operating lever 9 is turned counterclockwise against the biasing force of a spring 10. Accordingly, an armature 11 pivotally mounted on the lever 9 is brought into contact with a core 12 of a stop control magnet 34 fixed to the camera body. At the same time, a control lever 14 coupled through a spring 13 to the lever 9 is also turned counterclockwise, and therefore a locking section 14a is disengaged from an escapement or star-wheel 33 at the final stage of a speed slowing mechanism.

An anchor lever 38 is turned clockwise against the biasing force of a spring 39 by a pin 41 embedded in a lever (partially shown) engaging the auxiliary set lever 8. Therefore, an armature 37 pivotally secured to the anchor lever 38 is caused to be in contact with the core 35 of an auxiliary brake magnet 36, as a result of which an anchor 40 is displaced from the star-wheel 33. Under the condition that the armatures 11 and 37 are in contact with the cores 12 and 35, respectively, the set lever 5 is engaged with the locking lever 7. It goes without saying that the winding cam is so designed that in this operation the rotational displacement of the charge lever 1 is maximal. Furthermore, the winding cam is so designed that the charge lever 1 is turned counterclockwise in the winding operation thereafter. Accordingly, the fork-shaped lever 3 returns leaving the pin 4.

On the other hand, the upper speed change gear 19 engaged with the gear of a winding mechanism (not shown) is turned by the winding operation, and therefore a top curtain is wound or charged through a pulling element 21 by a top curtain pinion 20 engaged with the speed change gear 19. By means of a pin 23 embedded in the gear 19 and a pin 25 embedded in the lower speed change gear 24, the gear 24 is turned whereby a bottom curtain 27 is wound or charged by a bottom curtain pinion 26.

Furthermore, as one end portion 9a of the operating lever 9 is displaced, a top curtain locking lever 16 is allowed to turn clockwise by a relaying lever 15 with the aid of a spring 17 so as to be ready for engaging a top curtain locking cam 18. As the top curtain locking cam 18 is connected to the upper speed gear 19, its relative position is so determined that it engages the top curtain locking lever 16 upon completion of the winding operation. The toP curtain locking cam 18 is locked when winding is completed.

Now, a mirror box mechanism, will be described.

In FIG. 1, the charge lever 1 is turned clockwise by the winding operation. A pin 44 engages the one end portion 1a of the charge lever 1 and is fixed to a driving lever 45 (FIG. 2). The lever 45 is turned clockwise energizing a restoring spring 48 and a mirror lifting spring 46, and a locking section 45a engages a second locking lever 47 whereby the charging operation is accomplished. When the driving lever 45 is turned clockwise, a force is produced to turn a first operating lever 42 clockwise through the mirror lifting spring 46 and to displace rightward as viewed in FIG. 3 the one end portion 43a of a second operating lever 43 through the one end portion 42a of the lever 42. However, as the lever 43 is locked by the bent portion 57a of a first locking lever 57 (FIG. 3), the mirror lifting spring 46 is energized.

Figure 3:
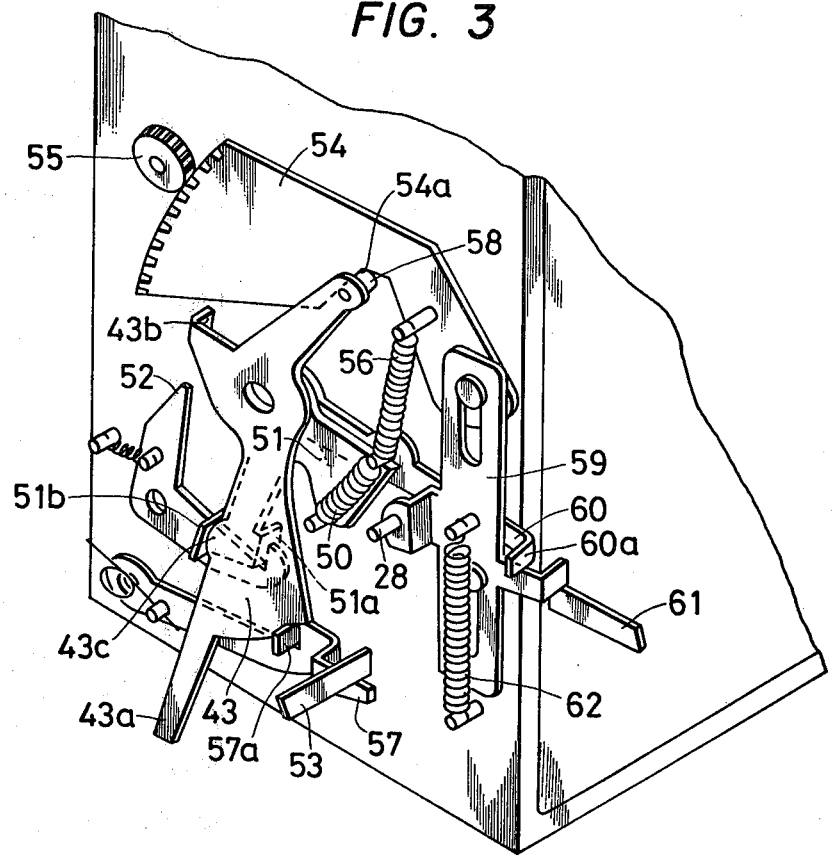
FIG. 3 is also a perspective view showing the side part of the mirror box mechanism.

On the other hand, a lens stop release plate 61 is energized in the lens stopping direction, or upward as viewed in FIG. 3, at all times, and a slide plate 59 engaging the plate 61 tends to displace upward against the biasing force of a restoring spring 62; however, the slide plate 59 is retained by the bent portion 60a of a restoring lever 60. This restoring lever 60 is coupled to a lever 51 through a coupling spring 50. The bent portion 51a of the lever 51 is locked by a third locking lever 52.

The structure of the speed slowing mechanism will now be described.

Referring back to FIG. 1; the coupling pin 28 is operated in association with the stop release plate (61 in FIG. 3) and the slide plate 59 on the lens side, and is engaged with the elongated groove 29a of a sector-shaped gear 29. The sector-shaped gear 29 engages a first pinion gear 30, and the operation of the gear 29 is transmitted through a spur gear 31 and a second pinion gear 32 to the star-wheel 33. The anchor 40 is positioned to confront the last one, or the star wheel 33, of the gear train. The object of this speed slowing mechanism is to enlarge the operational displacement of the stop release plate 61 thereby improving the control accuracy and reducing the locking power to improve durability.

A unidirectional clutch is disposed between the first pinion 30 and the spur gear 31. Such a clutch is described in copending application Ser. No. 828,117, filed Aug. 26, 1977 (corresponding to Japanese application No. 51-102413) and assigned to a common assignee with this application. When the coupling pin 28 is moved upward as viewed in FIG. 1, the first pinion gear 30 and the spur gear 31 forms one unit to rotate the star-wheel 33 thus effecting the necessary control, and when the star-wheel 33 is maintained locked the coupling pin is restored back to its lower position so as to restore the lens stop to its open state.

Now, the operation of the camera will be described starting from the release operation.

Upon depression of a release button (not shown), the release lever 53 is moved downward in FIG. 3. As a result, the first locking lever 57 is turned clockwise and is disengaged from the second operating lever 43. Therefore, the first operating lever 42 is turned clockwise as viewed in FIG. 2 by the mirror lifting spring 46, while the second operating lever 43 is turned counterclockwise in FIG. 3. Then, the pin 58 fixed to the second operating lever 43 is brought into contact with a cam section 54a of the mirror lifting lever 54 thereby turning the latter clockwise. As a result, a mirror lifting gear 55 engaged with the gear section provided at the end portion of the mirror lifting lever 54 is turned counterclockwise to move a mirror (not shown) upward. During the final period of operating the second operating lever 43, that is, the final period of lifting the mirror, the bent portion 43b of the second operating lever 43 kicks the third locking lever 52 to turn the lever 52 clockwise, thereby releasing the locking of the lever 51. As a result, the lever 51 and the restoring lever 60 are turned counterclockwise. The slide plate 59 retained by the restoring lever 60 starts its upward movement, and the lens stopping operation is started, and in addition the coupling pin 28 is operated to allow the speed slowing mechanism shown in FIG. 1 to start its operation.

On the other hand, in FIG. 1, the set lever 5 is locked by the locking lever 7 in the winding operation. However, the first operating lever 42 of the mirror box mechanism is turned by the camera release operation thereby causing the bent portion 42b of the first operating lever 42 to kick the one end portion 7a of the locking lever 7. The set lever 5 is instantly turned counterclockwise to its original position by means of the spring 6. In this operation, the operating lever 9 and the anchor lever 38 tend to turn, but they are prevented from doing so because the stop control magnet 34 and the auxiliary brake magnet 36 have been energized. Accordingly, the armatures 11 and 37 have been attracted to the cores 12 and 35, respectively.

Described below is an arrangement for controlling the stop value in response to variations in incident light quantity due to the lens stopping operation.

The finder viewing mirror has been raised. A light receiving element 63 is provided in the lower portion of the mirror box so as to be off the photographing incident light path as shown in FIG. 4. The photographing lens side of the top curtain 22 is subjected to reflection treatment so that the light receiving element can receive light reflected thereby.

Figure 5:
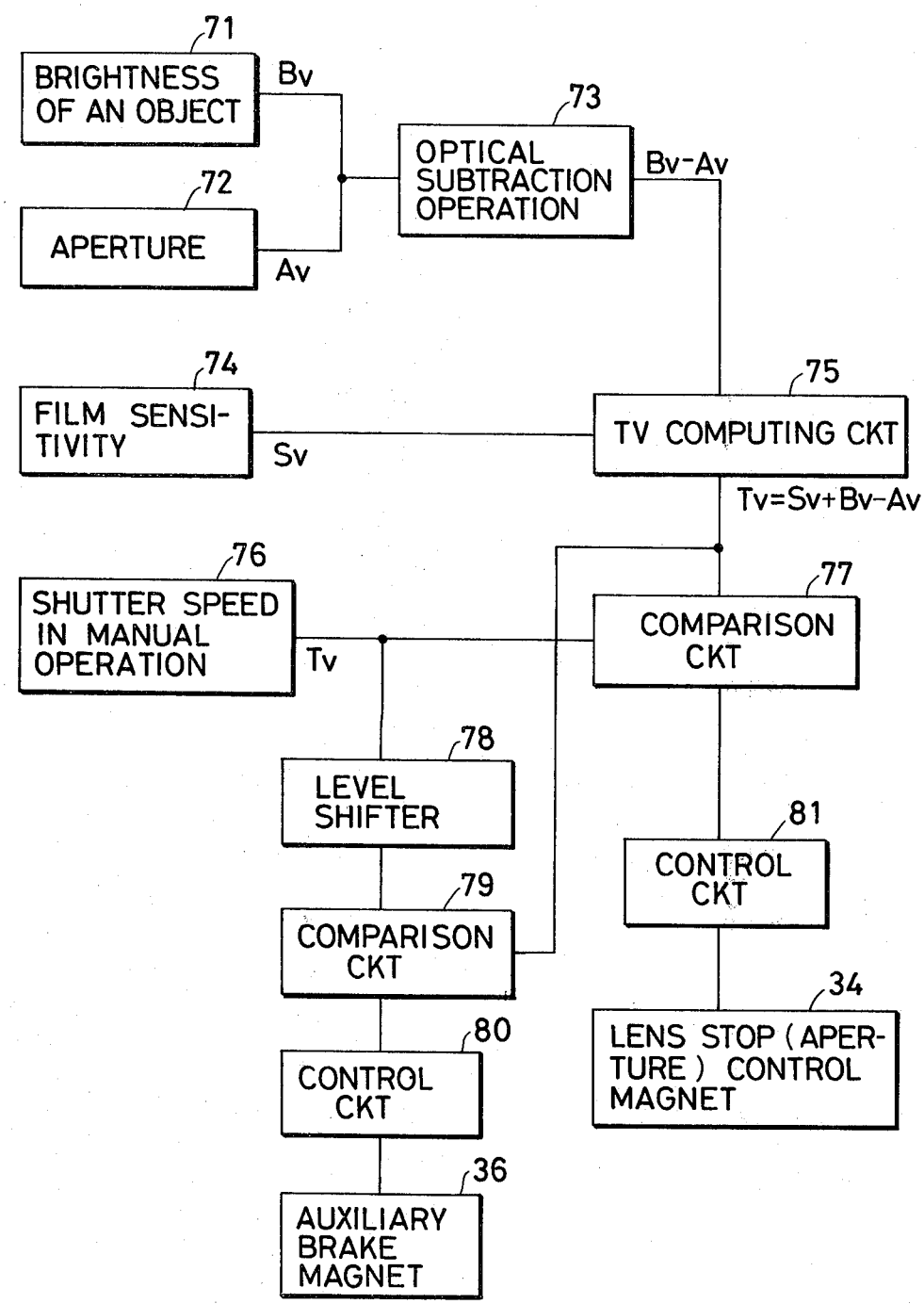
FIG. 5 is a block diagram of a circuit employed with the lens stop control shown in FIG. 1.

A block diagram of a control circuit is shown in FIG. 5. The apex value $B_V$ of the brightness of an object and the apex value $A_V$ of the variation in light quantity due to the lens stopping operation are represented by blocks 71 and 72. A subtraction operation $B_V - A_V$ is optically carried out in block 73, to which a value $S_V$ from block 74 representative of the film sensitivity is added in block 75, thereby to achieve the operation $T_V = S_V + B_V - A_V$, where $T_V$ is the computed shutter speed for fixed value $S_V$ and the instantaneous value $B_V - A_V$. Those skilled in the art will understand that the blocks 71, 72 and 73 are implemented by the light receiving element 63 and related circuitry, while the block 74 may be a potentiometer and the block 75 a simple adding circuit.

The computed value $T_V$ from block 75 is varied with the value $B_V - A_V$ which varies with the advancement of the lens stopping operation. This value $T_V$ is compared with a manually preset value $T_V$ from block 76 in a first comparison circuit 77, and is further subjected to comparison with a value obtained by deviating from the manually preset shutter speed by a prescribed value through the use of a level shifter 78 in a second comparison circuit 79. In this example, the level shifter 78 is so designed that the aforementioned value is obtained by shifting the preset shutter speed to a higher speed. Therefore, when the value $T_V$ obtained from circuit 75 and the shifted value $T_V$ from level shifter 78 coincide with each other, the energization of the auxiliary brake magnet 36 is suspended through a control circuit 80. As a result, the attraction of the armature 37 to the core 35 is released, and accordingly the anchor lever 38 is turned counterclockwise by means of the spring 39, while the anchor 40 engages the star-wheel 33. That is, the auxiliary braking is effected to slow down the displacement rate of the diaphragm. Then when the value $T_V$ from circuit 75 and the preset value $T_V$ from block 76 coincide with each other in the first comparision circuit 77, the energization of the stop control magnet 34 is suspended through a control circuit 81. Therefore, the attraction of the armature 11 to the core 12 is released, and the operating lever 9 is therefore turned clockwise by means of the spring 10. At the same time, the control lever 14 coupled through the spring 13 is also turned clockwise to engage the star-wheel 33 of the speed slowing mechanism. As a result, the operation of the lens stop release plate 61 is suspended through the coupling pin 28 and the slide plate 59, thereby setting the lens stop to a suitable value. The operating lever 9 is further turned clockwise to allow its one end portion 9a to kick the relaying lever 15, thereby releasing the locking of the top curtain locking lever 16 and the top curtain cam 18, as a result of which the top curtain 22 starts running.

After the lapse of time set by an exposure time setting mechanism, the bottom curtain starts running. During the final period of running the bottom curtain, the pin 47a secured to the second locking lever 47 (in FIG. 2) is kicked and turned clockwise, thereby releasing the driving lever 45. Then, the driving lever 45 is returned to its original position by means of the restoring spring 48, thereby restoring the second operating lever 43. In FIG. 3, the bent portion 51b of the lever 51 is depressed by the protrusion 43c of the second operating lever 43 thereby restoring the restoring lever 60 with the aid of the coupling spring 50. Accordingly, the slide plate 59 is also restored, and the lens stop is also restored to its wide open state. In this case, the speed slowing mechanism is maintained locked. However, as a unidirectional clutch is, as was described, provided between the first pinion gear 30 and the spur gear 31, the slide plate can be restored. In addition, the mirror lifting lever 54 is also restored with the aid of the spring 56, whereby the mirror is restored to its original position. Then, the lever 51 is engaged with the third locking lever 52. Thus, all of the operations have been completed.

Figure 6:
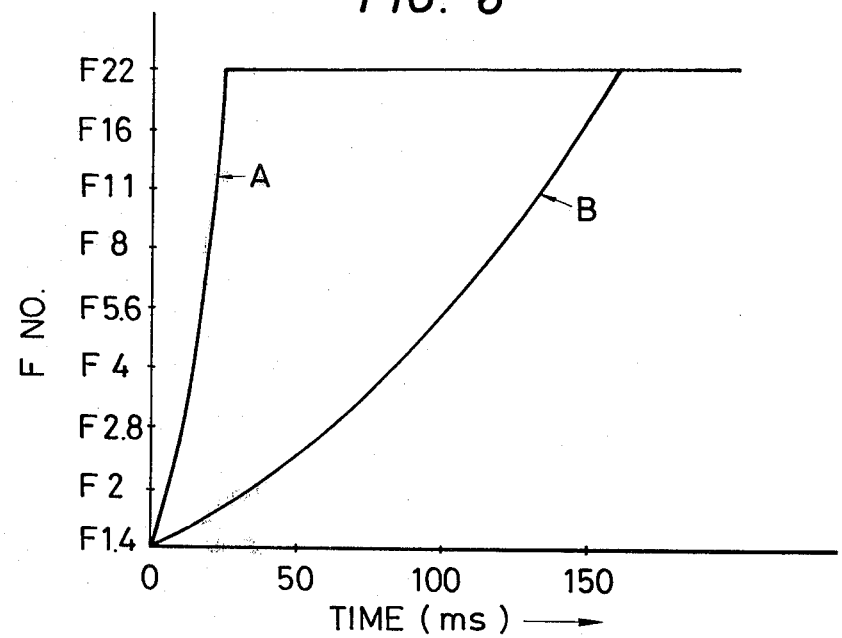
FIG. 6 is a graphical representation indicating relationships between the stop value and the time when an auxiliary brake is not employed.
Figure 7:
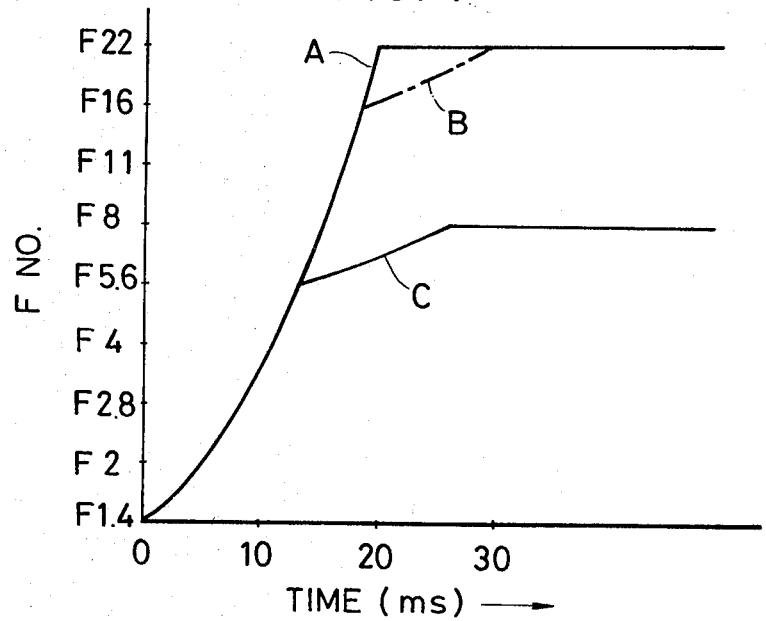
FIG. 7 is a graphical representation indicating relationships between the stop value and the time when an auxiliary brake is employed.

Shown in FIGS. 6 and 7 are graphical representations indicating relationships between time and stop value obtained by converting variations in light quantity of the light receiving element 63 with respect to the stop control operation. In these graphical representations, a lens in a range of F1.4 to F22 is employed, and the auxiliary braking is effected before 1EV.

FIG. 6 indicates light quantity variation curves obtained in the case A where the speed slowing mechanism is moderately operated (the entire travelling time is 24 ms) in order to shorten the entire travelling time without auxiliary braking, and in the case B where the entire travelling time is increased to improve the accuracy (the entire travelling time is 160 ms). The amount of displacement per EV of the lens stop release plate in the vicinity of the minimum lens stopping is, in general, smaller than that in the vicinity of the wide lens opening. Therefore, even if the lens stop release plate is moved at substantially uniform speed, the variations in light quantity are abrupt in the vicinity of the minimum lens stopping. In this example, with the curve A, it takes 1.5 ms for the stop value to change from F16 to F22. If the stop control magnet 34 fluctuates 2 ms, the control becomes completely impossible. In order to overcome this difficulty, in the case B the entire travelling time is increased, that is, it takes 12 ms for the stop value to change from F16 to F22. In this case, even if the stop control magnet fluctuates 2 ms, its error is merely of 1/6 (0.17) EV. However, in the case where approximately F22 is suitable, the control time is added to the delay time from the release to the shutter start of an ordinary single lens reflex camera, whereby the delay time is considerably increased.

On the other hand, FIG. 7 is the graphical representation relating to the speed slowing mechanism provided with the auxiliary braking means according to one feature of this invention. In the case when the operation is made without the auxiliary braking, the entire travelling time is 20 ms (Curve A). Curve C indicates the case where, for instance, F8 is suitable and the auxiliary braking is applied at F5.6, or 1EV early. As is apparent from this graphical representation, the auxiliary braking is effected at F5.6, the diameter of the aperture is slowly changed, that is, it takes 12.5 ms for the stop value to change from F5.6 to F8. In spite of the fact that when the locking magnet fluctuates 2 ms, the fluctuation of the error is merely 2/12.5 (0.16) EV. In the case where F22 is suitable, the auxiliary braking is again effected 1EV early, and the operation is completed in 30 ms as is apparent from Curve B.

As was described above, according to this feature of the invention, when a suitable exposure value is obtained, the energization of the auxiliary brake magnet 36 is suspended earlier by the prescribed value to effect the auxiliary braking before the lens stopping operation is stopped. Therefore, although the entire operating time is short, the lens stop control can be carried out with high accuracy.

Figure 8:
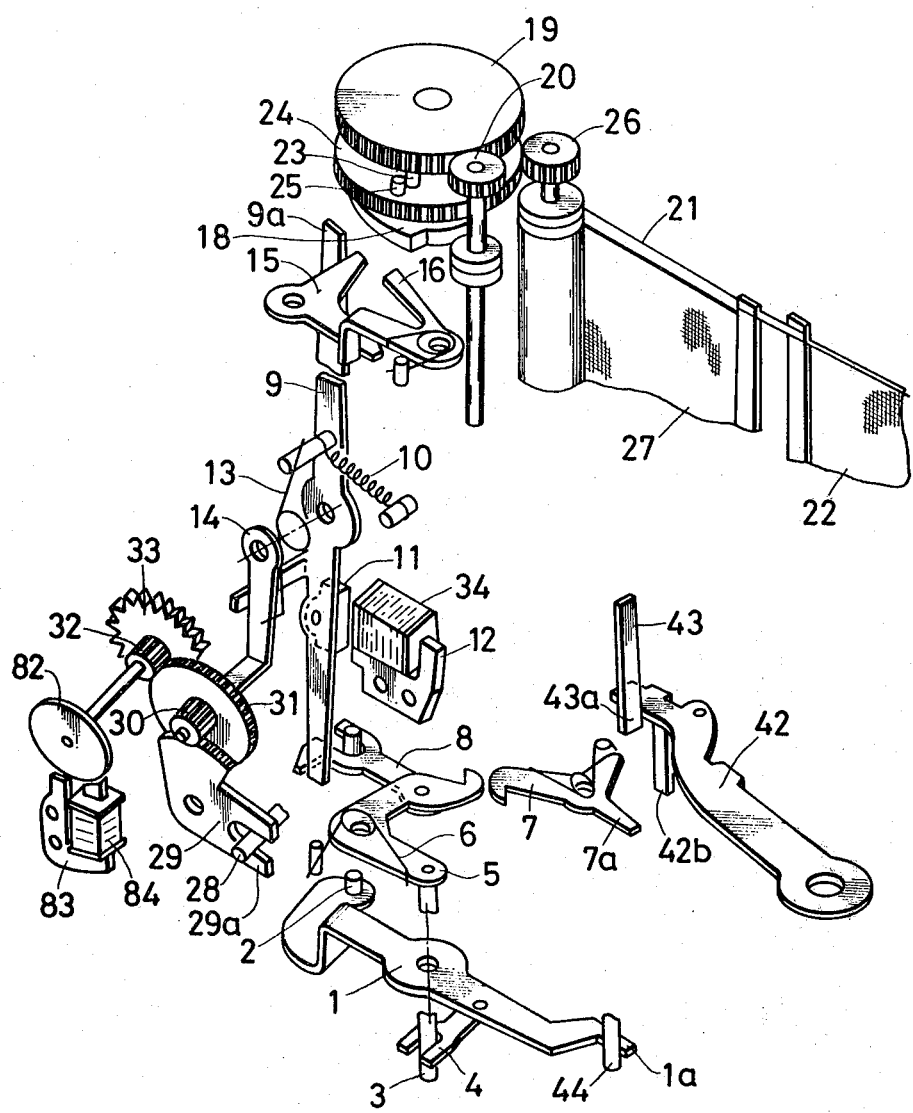
FIG. 8 is a perspective view illustrating a lens stop control and a top curtain locking section according to another feature of the invention.

FIG. 8 illustrates the structures of an aperture value control mechanism and a stop value uniform variation controller, and the structure of a top curtain release device before the winding. The aperture value control mechanism and the top curtain release device are identical to the same structures illustrated in FIG. 1; therefore, no further description of these structures is believed to be necessary. The stop value uniform variation controller comprises a control disk 82 mounted on a common shaft with the second pinion gear 32 in the speed slowing mechanism. Adjacent to the periphery of the control disk 82 is the core 83 of a lens stop magnet 84. When the magnet 84 is energized, the disk 82 is attracted to the core 83 so that this structure acts as a brake in the final stage of the speed slowing mechanism.

Figure 9:
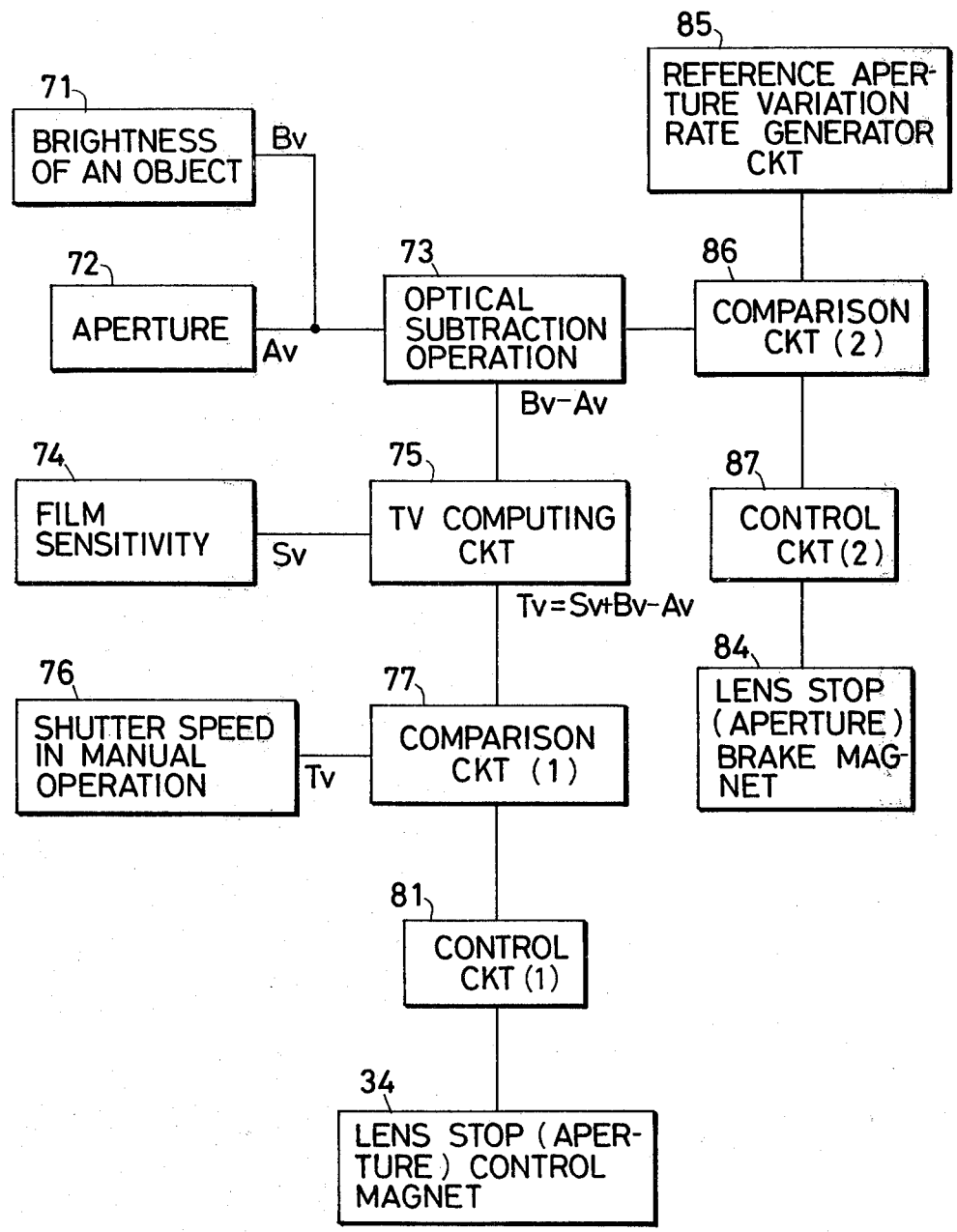
FIG. 9 is a block diagram of a circuit employed with the lens stop control shown in FIG. 8.

FIG. 9 shows a block diagram of a control circuit employed with stop value uniform variation controller.

As in the circuit shown in FIG. 5, the brightness of an object from block 71 and the variation in light quantity due to the lens stopping operation from block 72 are optically subtracted in block 73 to produce an output $B_V-A_V$. A value $S_V$ representative of the film sensitivity from block 74 is added to the output of block 73 in the $T_V$ computing circuit 75 to produce an output $T_V=S_V+B_V-A_V$. The variation of the output $B_V-A_V$ from block 73 is compared with a reference aperture variation rate provided by a reference aperture variation rate generator circuit 85 in a comparison circuit 86. The rate generator circuit 85 is a conventional function generator, and in its simplest form, may be a linear integrator and invertor. When the aperture decreasing rate is greater than the reference aperture variation rate, the lens stop brake magnet 84 is energized through a control circuit 87. As a result, in FIG. 8, the control disk 82 is attracted to the core 83 to brake the control disk 82. Therefore, the rotation of a second pinion gear 32 coaxially secured to the control disk 82 is slowed down, and the rotation of the star-wheel 33 is also slowed down. As a result, the operation of the lens stop release plate 61 is slowed down through the coupling pin 28 and the slide plate 59, thus slowing down the lens stopping rate. In contrast to the above-described case, when the aperture decreasing rate is smaller than the reference aperture variation rate, the lens stop brake magnet 84 is de-energized through the control circuit 87. As a result, in FIG. 8, the attraction of the control disk 82 is eliminated, so that the control disk 82 is accelerated by the lens stop release plate 61.

As in the circuit of FIG. 5, the value $T_V$ is varied with the value $B_V-A_V$ which varies with the advancement of the lens stopping operation. The value $T_V$ from circuit 75 is compared with the value $T_V$ of the manually preset shutter speed from block 75 in the comparison circuit 77. When the computed value $T_V$ coincides with the preset value $T_V$ in the comparison circuit 77, the energization of the lens stop control magnet 34 is suspended through the control circuit 81. As a result, the armature 11 is released from the core 12, and the operating lever 9 is turned clockwise by means of the spring 10. At the same time, the spring-coupled control lever 14 is also turned clockwise to engage the star-wheel 33 of the speed slowing mechanism, whereby the operation of the lens stop release plate 61 is stopped through the train of gears, the coupling pin 28, and the slide plate 59 to thereby stop decreasing the aperture at a suitable value. The operating lever 9 is further turned clockwise to allow its one end portion 9a to kick the relaying lever 15, thereby releasing the locking of the top curtain locking lever 16 and the top curtain 18, as before.

Figure 10:
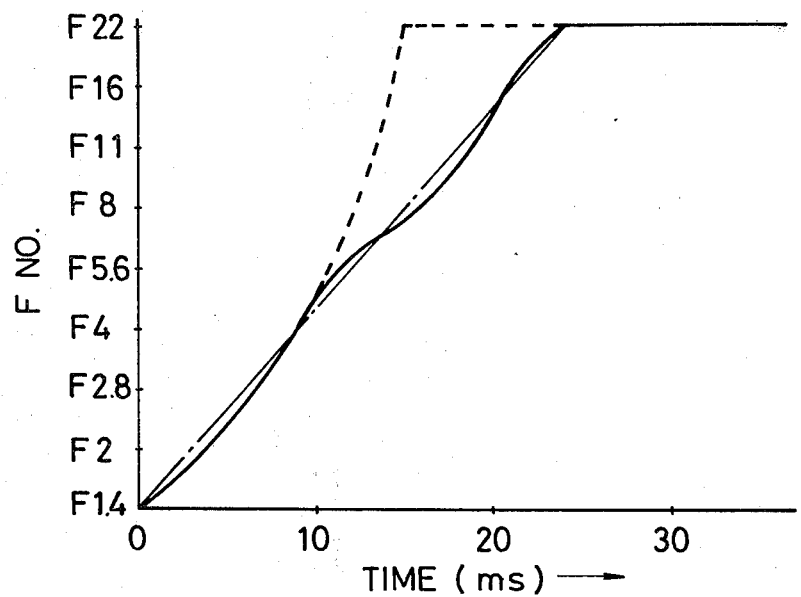
FIG. 10 is a graphical representation indicating relationships between the stop value variation and time using the system shown in FIGS. 8 and 9.

FIG. 10 shows a graphical representation indicating relationships between time and stop value obtained by converting variations in light quantity of the light receiving element 63 with respect to the stop control operation. As before, in this graphical representation, a lens having a range of F1.4 to F22 is employed. As was described before with reference to FIG. 6, the amount of displacement per EV of the lens stop release plate in the vicinity of the minimum lens stopping is, in general, smaller than that in the vicinity of the wide lens opening. Therefore, even if the lens stop release plate is moved at substantially uniform speed, the variations in light quantity are abrupt in the vicinity of the minimum lens stopping. On the other hand, the curve (solid line) in FIG. 6 representative of the case where the stop value uniform variation feedback mechanism according to the second feature this invention is employed, is almost linear, and the entire travelling time is relatively short, or 24 ms. However, the operating time is 3 ms even in the vicinity of the minimum lens stopping, which permits control with sufficiently high accuracy.

Figure 11:
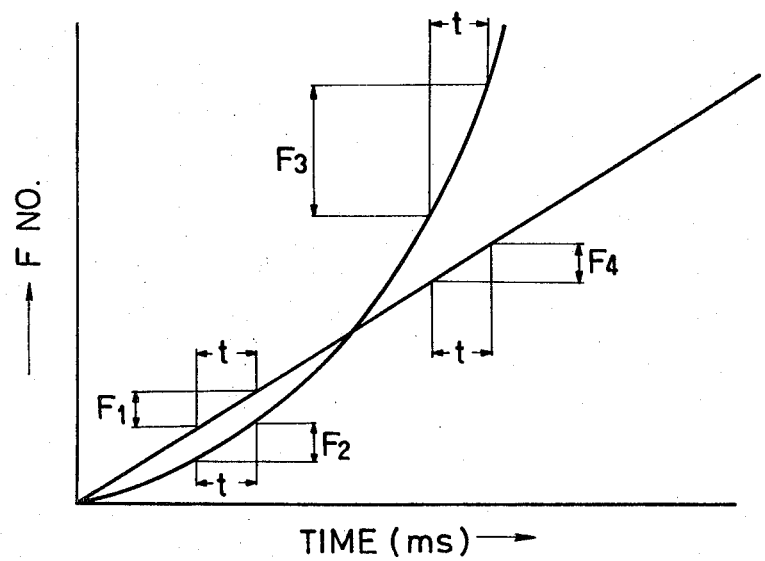
FIG. 11 is also a graphical representation indicating the delay times of magnets.

Incidentally, a magnet suffers from a delay time, which was not mentioned in the above description of the operation. Therefore, the magnet must be deenergized slightly before the aimed brightness is obtained. This delay time remains substantially unchanged. Therefore, in the case A having no stop value uniform variation feedback mechanism of this invention, as is shown in FIG. 11, even if the delay times are equal (t), $F_2$ is not equal to $F_3$. Therefore, in the case A the delay time does not correspond to the stop value actually controlled after the de-energization of the magnet. On the other hand, in the case B having the stop value uniform variation feed back mechanism of the invention, $F_1$ is equal to $F_4$; that is, the delay time corresponds to the stop value actually controlled after the de-energization of the magnet, whereby the control can be achieved as desired.

As is apparent from the above description, the relation between stop value variation and time is made substantially linear. Therefore, in spite of the fact that the entire operating time is short, the control can be achieved with high accuracy, being not affected by the delay time of the locking magnet.

What is claimed is:

1. In an automatic exposure camera of the stop value control type wherein a suitable lens aperture diameter is obtained with respect to light reflected by an object, a preset shutter speed and film sensitivity, said automatic exposure camera having a lens stopping mechanism operated by a first magnet in response to measured variations in the object's light passed through the lens aperture to effect stop value control, the improvement comprising:

a brake magnet mechanism means having a second magnet for decelerating but not stopping the lens stopping mechanism, and a control circuit responsive to the measured variations in the object's light passed through the lens aperture for controlling said second magnet of said brake magnet mechanism means.

2. The improvement in an automatic exposure camera as recited in claim 1 wherein said control circuit comprises:
means for measuring the variation in the difference of the apex brightness value $B_V$ and aperture $A_V$ to generate an output difference signal, and
means responsive to said output difference signal and preset values of film sensitivity $S_V$ and shutter speed $T_V$ for generating a control signal to operate said second magnet of said brake magnet mechanism means slightly before a suitable exposure value is obtained by variation in diameter of said lens aperture so as to slow down the movement of said lens stopping mechanism.

3. The improvement in an automatic exposure camera as recited in claim 2 wherein said brake magnet mechanism means comprises:
a star-wheel driven by said lens stopping mechanism,
an anchor mounted on an anchor lever and positioned to confront said star-wheel, said anchor lever being pivotally mounted to move said anchor into and out of contact with said star-wheel, and wherein said second magnet is
responsive to said control signal for controlling the movement of said anchor lever.

4. The improvement in an automatic exposure camera as recited in claim 3 wherein said anchor lever is biased to move said anchor into contact with said star-wheel and has an armature mounted thereon, said armature being attracted to the core of said second magnet when said second magnet is energized thereby holding said anchor out of contact with said star-wheel, said control signal causing said magnet to be deenergized.

5. The improvement in an automatic exposure camera as recited in claim 4 wherein said lens stopping mechanism includes a speed slowing mechanism comprising a train of gears, said star-wheel being connected to the last stage of said train of gears.

6. The improvement in an automatic exposure camera as recited in claim 1 wherein said control circuit comprises:
means for measuring the variation in the difference of the apex brightness value $B_V$ and aperture value $A_V$ to generate an output difference signal,
means for generating a reference aperture variation rate signal, and
means for comparing said difference signal with said reference rate signal to generate a control signal to operate said second magnet of said brake magnet mechanism means.

7. The improvement in an automatic exposure camera as recited in claim 6 wherein said brake magnet mechanism means comprises:
a control disk driven by said lens stopping mechanism, and
wherein said second magnet is positioned to be adjacent the periphery of said control disk and responsive to said control signal to attract said disk when energized thereby braking said lens stopping mechanism.

8. The improvement in an automatic exposure camera as recited in claim 1 wherein said lens stopping mechanism includes a speed slowing mechanism comprising a train of gears, said control disk being connected on a common shaft to the last stage of said train of gears.

9. In an automatic exposure camera of the stop value control type wherein a suitable lens aperture diameter is obtained with respect to light reflected by an object, a preset shutter speed and film sensitivity, said automatic exposure camera having a lens stopping mechanism operated by a first magnet in response to measured variations in the objects light passed through the lens aperture to effect stop value control, the improvement comprising:
a brake magnet mechanism means having a second magnet for decelerating but not stopping the lens stopping mechanism;
means for measuring the variation in the difference of the apex brightness $B_v$ and aperture $A_v$ to generate an output dIfference signal;
a $T_v$ computing circuit for adding a signal proportional to a film sensitivity value $S_v$ to said difference signal to generate a computed $T_v$ signal;
level shifting means responsive to a signal proportional to a signal proportional to a preset shutter speed value $T_v$ to generate a shifted $T_v$ signal;
comparing means responsive to said computed $T_v$ signal for generating a control signal to operate said second magnet of said brake magnet mechanism means slightly before a suitable exposure value is obtained by variation in diameter of said lens aperture so as to slow down the movement of said lens stopping mechanism.

* * * * *